United States Patent [19]

Fitzner

[11] 4,244,336
[45] Jan. 13, 1981

[54] LOW SPEED LIMITER UNIT FOR INTERNAL COMBUSTION ENGINE IGNITION SYSTEMS

[75] Inventor: Arthur O. Fitzner, Fond du Lac, Wis.

[73] Assignee: Brunswick Corporation, Skokie, Ill.

[21] Appl. No.: 912,348

[22] Filed: Jun. 5, 1978

[51] Int. Cl.³ ............................................. F02P 5/04
[52] U.S. Cl. .................................. 123/418; 123/602; 123/149 C
[58] Field of Search .......... 123/117 A, 117 D, 117 R, 123/149 R, 149 C, 149 D, 148 CC, 102

[56] References Cited

U.S. PATENT DOCUMENTS

| | | | |
|---|---|---|---|
| 3,703,887 | 11/1972 | Panhard | 123/117 R |
| 3,874,349 | 4/1975 | Fitzner | 123/117 R |
| 3,898,894 | 8/1975 | Aono et al. | 123/148 E X |
| 4,075,989 | 2/1978 | Nagasawa | 123/117 R |
| 4,111,174 | 9/1978 | Fitzner et al. | 123/148 CC |
| 4,132,208 | 1/1979 | Yukawa | 123/148 CC |
| 4,140,092 | 2/1979 | Lanning et al. | 123/117 A |

Primary Examiner—Tony M. Argenbright
Attorney, Agent, or Firm—Wm. G. Lawler, Jr.; Lewis L. Lloyd

[57] ABSTRACT

A solid state ignition system is provided for a two cycle internal combustion engine. A low speed limiter unit includes an electronic spark advance controller means connected to the ignition system to automatically advance the ignition angle by a substantial amount below a desired low limit speed. A speed sensing means is connected to sense the engine speed and at the selected minimum engine speed actuates the advance controller. The advance controller preferably has an asymmetrical rate of response, producing a relatively rapid advance output and a relatively slow retard output in response to changes in the speed sensing means.

19 Claims, 6 Drawing Figures

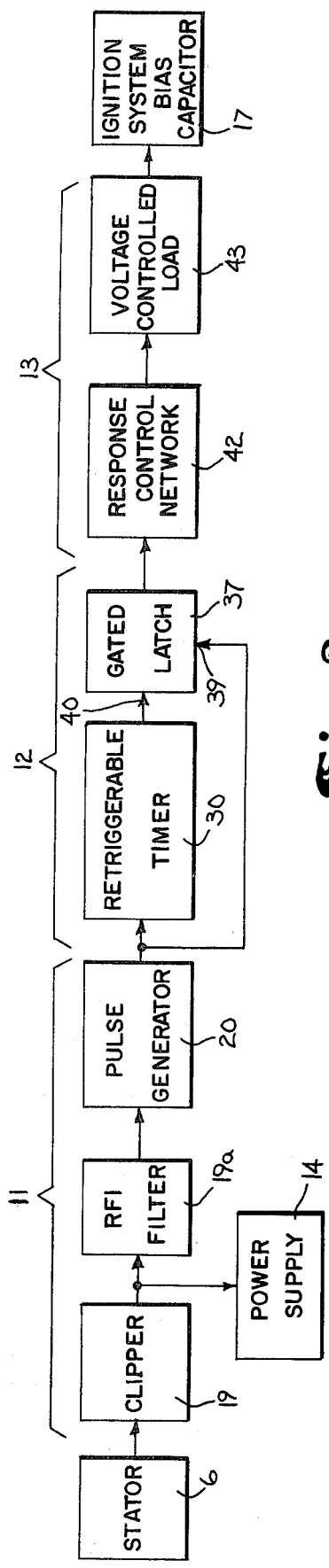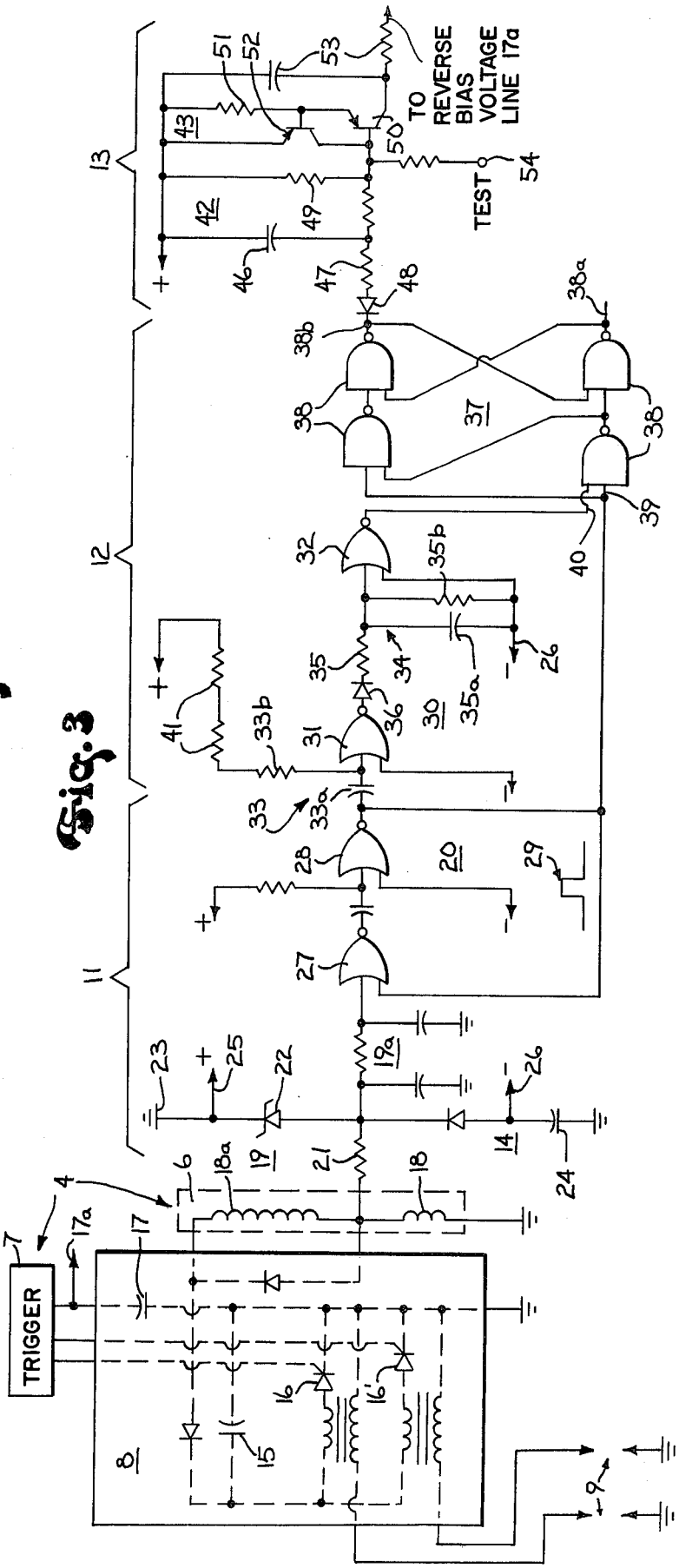

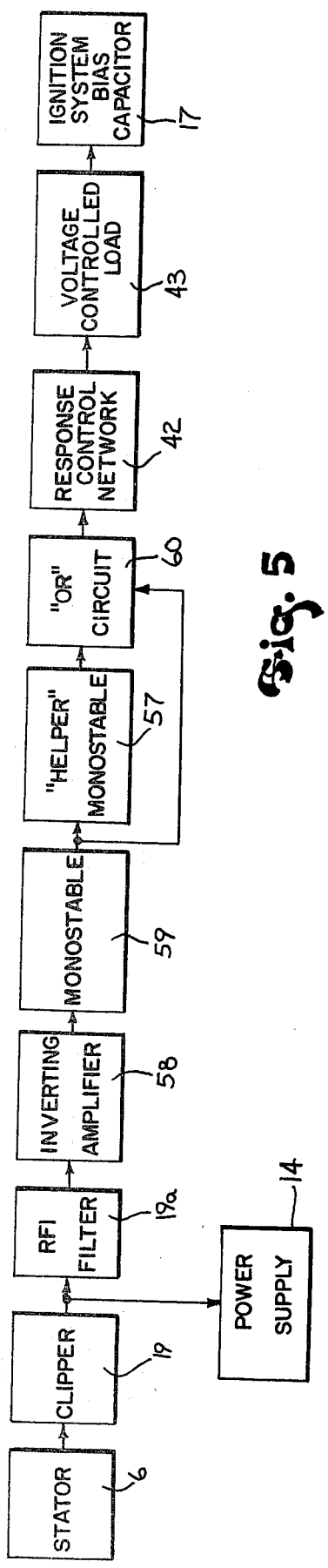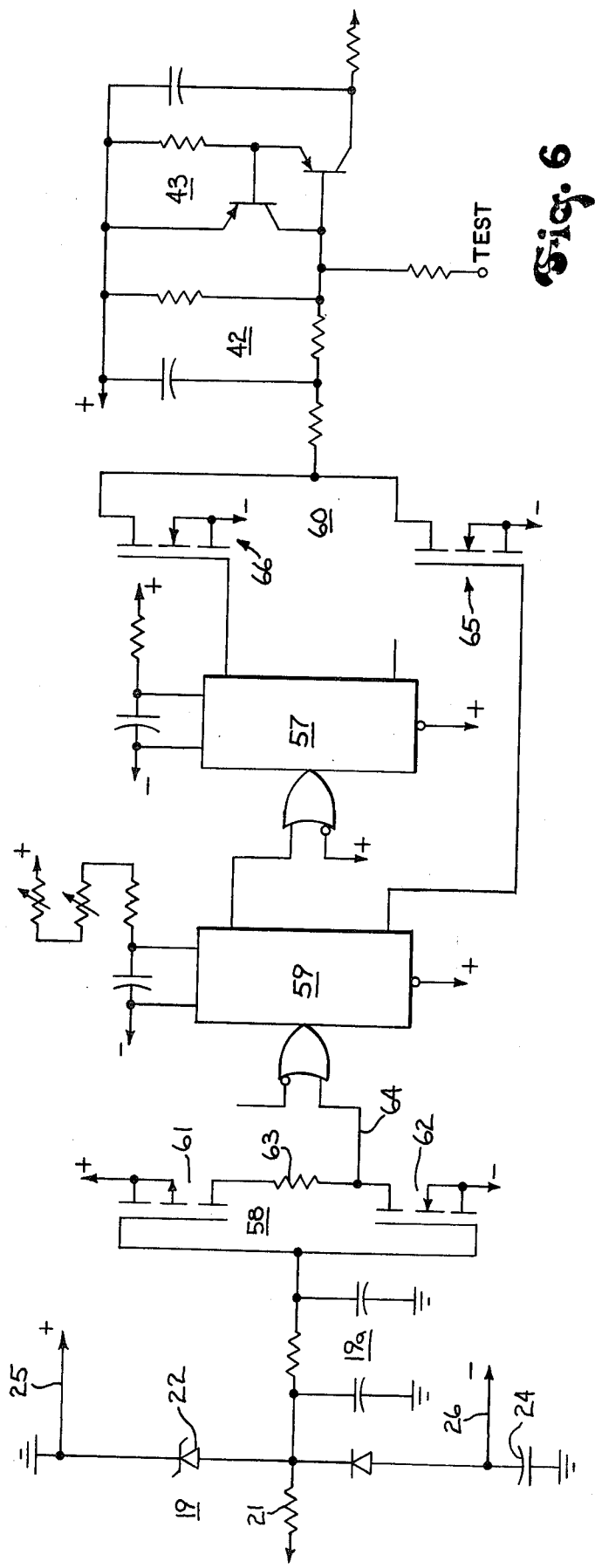
Fig. 5
Fig. 6

LOW SPEED LIMITER UNIT FOR INTERNAL COMBUSTION ENGINE IGNITION SYSTEMS

BACKGROUND OF THE INVENTION

This invention relates to solid state ignition systems for internal combustion engines particularly as applied to larger outboard motors employing two cycle engines.

High horsepower outboard motors generally include an engine with four or more cylinders. The engine is coupled to the propeller unit by a gear shift means having neutral, forward, and reverse gear settings. Shifting generally is done by the operator with the engine at idle speed. Stalling of the engine may result from sudden application of the propeller load, such as by rapid shifting between a brisk forward boat speed to reverse idle, or if the water level should rise above and block the idle relief exhaust ports and create excessive crankcase back pressure conditions. Various other conditions may also exist which result in improper engine operation at idle or low speed. Improper engine idle operation may for example be caused by dirt in the carburetor, water in the fuel supply, as well as an improper air-fuel mixture. Various electrical system problems such as fouled spark plugs, electrical supply failures to one or more of the spark plugs and the like may also cause poor engine operation under idle speed conditions. These and similar conditions which interfere with proper idle speed operation further increase the probability of stalling the engine. An electronic idle speed control which has been satisfactorily used since early 1977 in two cylinder, two cycle outboard motors of relatively low horsepower, such as a four horsepower outboard motor unit, is disclosed in the copending application of Arthur O. Fitzner et al entitled IGNITION SYSTEM WITH IDLE SPEED GOVERNOR APPARATUS which was filed on Jan. 4, 1977 with Ser. No. 756,649, now U.S. Pat. No. 4,111,174. The system disclosed therein has provided improved operation under certain conditions but has not avoided the various faults noted above in the larger engines. The system was also found to be subject to various manufacturing and assembly tolerances.

SUMMARY OF THE PRESENT INVENTION

The present invention is particularly directed to a solid state ignition system having novel idle or low speed limit control means providing a rapidly responding electronic spark advance means to establish a steep, step-like change in the angle of ignition below a selected low engine speed and thereby maintain low speed engine operation even under adverse conditions such as a fuel supply or an electrical power supply which is less than ideal as well as with sudden heavy propeller loading, creation of abnormal exhaust back pressure conditions and the like. In accordance with the present invention, an electronic advance means is connected to the ignition system to automatically and rapidly advance the timing with a step-like ignition angle vs. RPM characteristic. Thus, the spark angle is advanced by as much as 9 degrees within a narrow speed range including the desired switching speed. A speed sensing means is connected to sense the engine speed and at a selected minimum engine speed actuates the advance means. The advance means preferably has an asymmetrical rate of response, producing a relatively rapid advance output and a somewhat slower retard output in response to the speed sensing means. The sensing means preferably produces a series of pulses during each complete multi-cylinder firing sequence and, at a preselected minimum speed, actuates a rapid, high gain switch means. The switch means may be of any suitable type or construction which switches between essentially wholly "on" and "off" states in the narrow speed range including the desired switching speed. A narrow speed range is defined for purposes of defining this invention as including a range less than ±5 percent of the selected speed. A preferred speed range is less than ±2 percent of the selected speed. A highly satisfactory switch means includes digital logic circuit elements coupled to the stator windings of an engine driven alternator and generating a rapidly changing control signal at the preselected speed. The control signal may then actuate a rapid acting switch which is connected to operate the advance controller means. The logic circuit and switch may even take the form of an appropriately programmed microprocessor unit. The advance means may be any suitable electronic timing advance circuit. The system preferably has an asymmetrical rate of response with a relatively rapid turn on or advance and a somewhat slower return to the normal or retarded condition.

The present invention has been found to provide an ignition system which essentially prevents engines from stalling at idle, allows new tight engines to idle satisfactorily during initial testing, and permits a carburetor recalibration at idle speed to minimize creation of exhaust smoke.

BRIEF DESCRIPTION OF DRAWINGS

The drawings furnished herewith illustrate a preferred construction of the present invention in which the above advantages and features are clearly disclosed as well as others which will be readily understood from the following description.

In the drawings:

FIG. 2 is an expanded block diagram illustrating a preferred embodiment of the present invention;

FIG. 3 is a schematic circuit illustration of the preferred embodiment shown in FIG. 2;

FIG. 5 is a block diagram of an alternate embodiment of the present invention; and FIG. 6 is a schematic circuit illustration of the alternate embodiment of the present invention.

DESCRIPTION OF THE ILLUSTRATED EMBODIMENT

Figure 1:
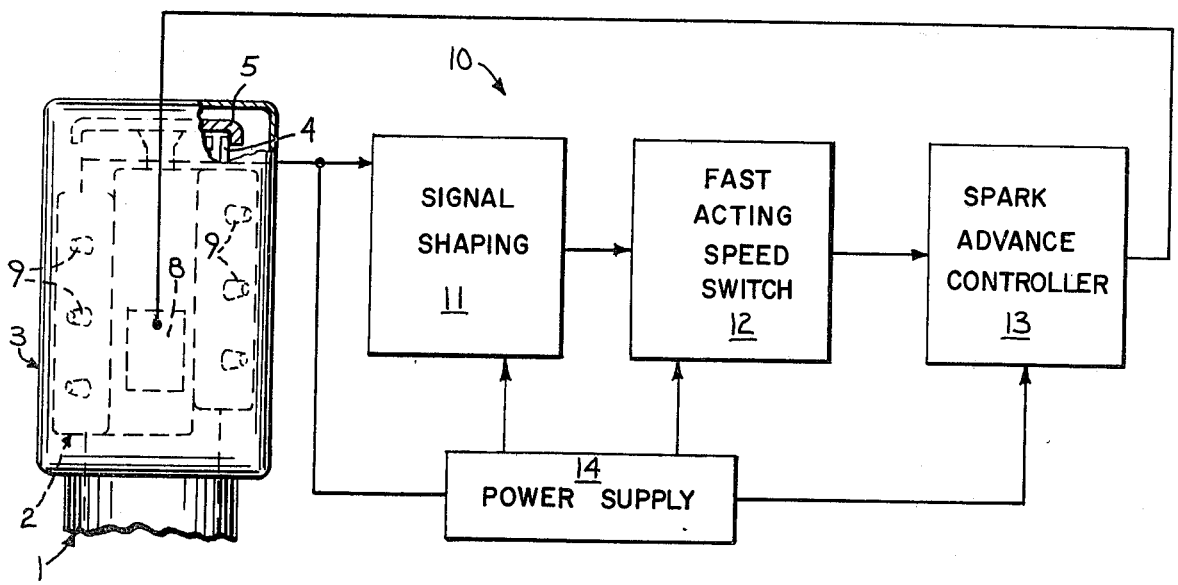
FIG. 1 is a diagrammatic illustration of an outboard unit employing an alternator driven capacitor discharge ignition system with a low speed limiter in accordance with the teaching of the present invention shown in block diagram.

Referring to the drawings and particularly to FIG. 1, an outboard motor 1 is diagrammatically illustrated including a V-6 engine 2 mounted as a part of the powerhead 3. The engine 1 is coupled through a suitable drive mechanism to a lower propeller unit, not shown. The drive mechanism would include a suitable shift mechanism such as is well known. An engine-driven combination alternator/trigger pulse generator unit 4 is located under the rotating flywheel 5 which is located at the upper end of the engine.

The outputs of the mechanically stationary alternator or stator portion 6 are alternating voltages of a frequency directly related to the engine speed, and are used to supply the ignition energy to the ignition system.

The outputs of the mechanically movable trigger pulse generator portion 7 are triggering voltages which provide the ignition timing intelligence and the multi-cylinder spark distribution intelligence to the ignition system.

Normally, the ignition angle is advanced as required at the higher engine speeds by a mechanical linkage which causes the movable trigger pulse generator portion 7 to be angularily repositioned as the engine speed control level is moved. The relationship is not linear, but the technology is well-known to those skilled in the art and need not be explained or considered further.

The capacitor discharge ignition system 8 receives the outputs of the combination alternator/trigger pulse generator unit 4 and provides power to the several spark plugs 9.

In addition, in the present invention, one output of the combination alternator/trigger pulse generator unit 4 is also coupled to a low speed limit circuit 10 which generally includes a signal shaping and conditioning portion 11, a fast acting speed switch 12 and an electronic spark advance controller 13. The several components of circuit 10 in the illustrated embodiment derive their power from a power supply portion 14 which may be driven from combination alternator/trigger pulse generator unit 4.

The signal conditioning portion 11 takes a raw waveform signal from the alternator 4 and makes it compatible with the input requirements of the speed switch 12.

Figure 4:
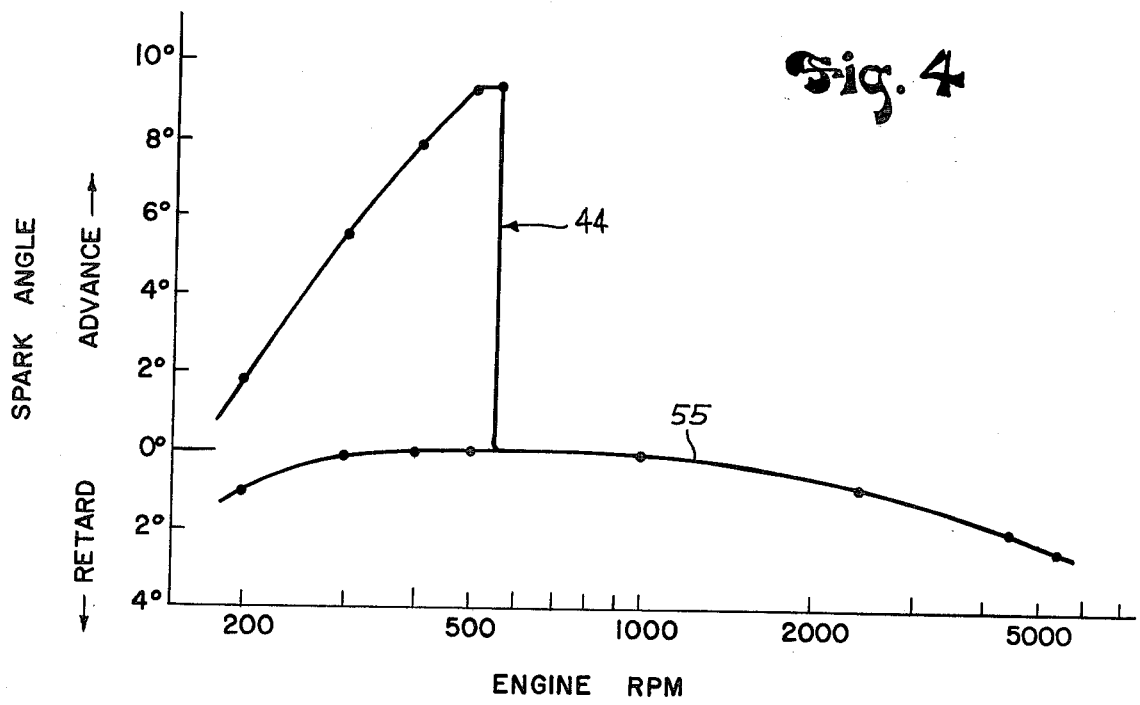
FIG. 4 is a graphical illustration of the electronic timing characteristic showing the ignition angle versus speed with a mechanically fixed trigger position for a 6-cylinder two-cycle ignition system incorporating the preferred embodiment of the invention.

The speed switch 12 is a generic definition for any device or circuit that has the capability of changing from a full off to a fully on condition within a relatively narrow speed range. Thus, the speed switch 12 may be a typically true switch which turns fully on or fully off in accordance with the frequency of the conditioned signal from the circuit 11. Alternately, switch 12 can be a tachometer type circuit followed by a biased amplifier having a high gain so that its output changes rapidly from full on to full off within a narrow speed range. The output of the speed swithc should be such that when it turns on, an adequate driving signal is supplied to the spark advance controller 13 to cause that section of the circuit to slew rapidly but not instantaneously toward the maximum electronic advance condition, and thereby create a step-like change in the timing characteristic such as shown in FIG. 4. Generally, the speed switch should have a minimal hysteresis. Significant hysteresis would complicate the accurate factory calibration of the unit and would tend to create an idle speed surge each time the speed switch turned on and called for a spark advance.

The spark advance controller 13 may be any suitable electronic means for advancing of the ignition angle at idle speeds such as to cause the engine to develop more power. The controller however, is preferably constructed with limits on its response rates. Without any limit on the rates of spark advance and spark retard, there would be a tendency for the spark angle to move rapidly and violently back and forth. In an optimum construction, the rate of spark retard is reduced sufficiently to smooth out engine idle. The rate of spark advance is only reduced sufficiently to permit the low speed limit circuit to retain the desired quick reaction time when confronted with a rapidly dropping engine speed which, in fact, drops below the predetermined minimum speed.

A preferred embodiment is shown in FIGS. 2 and 3. FIG. 2 is an expanded block diagram of the preferred embodiment and FIG. 3 is a schematic circuit illustrating a digital logic system.

The ignition system 8 is assumed to be an alternator driven system similar to that shown in U.S. Pat. No. 4,015,564 and is only illustrated in oversimplified form in FIG. 3. The system generally includes a main firing capacitor means 15 connected by individual gated controlled rectifiers 16, 16' to the individual spark plugs via individual ignition transformers. The controlled rectifiers 16, 16' are turned on by the trigger generator 7, the output of which varies with speed. A bias capacitor 17 is connected in series with the trigger generator output to establish a constant firing signal angle, as more fully developed in such patent.

The output of the spark advance controller 13 may for example be connected to the reverse bias voltage line 17a of capacitor 17, as shown in the U.S. Pat. No. 4,015,564. In U.S. Pat. No. 4,015,564 capacitors 52 and 52' in parallel comprise capacitor 17 of FIG. 3. The controller output therefore modifies the reverse bias voltage and changes the ignition angle of all six spark plugs in the same manner. The system of course is connected to a common ground as shown in FIG. 3 which would also provide for the common ground connection shown in U.S. Pat. No. 4,015,564.

In FIGS. 2 and 3, the signal conditioning circuit 11 includes a suitable clipper circuit 19, an RFI Filter 19a and a pulse generator 20. The ignition power source or stator portion 6 of alternator 4 includes high speed and low speed windings 18 and 18a with winding 18 more effective in charging of capacitor means 15 at higher engine speeds and winding 18a more effective at lower engine speeds. Generally the high speed winding 18 has considerably fewer turns than the low speed winding 18a. The signal conditioning circuit 11 is connected to the winding 18 because such winding is not noticably affected by the small additional loading of a signal shaping and logic circuit, whereas winding 18a would be.

The clipper circuit 19 limits the output signal to a selected maximum voltage level. In FIG. 3, the circuit 19 is illustrated in a conventional construction including a series ballast resistor 21 connected to supply a Zener diode 22, the opposite side of which is connected to ground 23. In a practical application, the voltage at the Zener diode is clamped at about +0.6 volts when the stator voltage is positive and clipped at about −7.2 volts when the stator output is negative. The shaped signal across the Zener diode 22 and particularly the negative half-cycle is rectified and stored in a power supply capacitor 24 with the positive and negative voltage lines 25 and 26 essentially connected to opposite sides of the capacitor 24.

The RFI filter 19a is shown connected to the output of the clipper circuit 19 to by-pass RFI transients to ground. As shown in FIG. 3, the RFI filter 19a may be a simple low-pass resistor-capacitor network.

The filtered output is essentially a square wave signal contained within voltage limits which are typically only 0.6 volt more positive or more negative than the positive and negative supply voltages, respectively. However, at low speeds such as idle speed, the transitions of the signal will not be sufficiently rapid to provide proper operation of the digital logic circuits employed in this invention.

In the preferred embodiment of the invention, the partially shaped and clipped signal actuates a pulse generator 20 for generating an essentially rectangular pulse signal. As shown in FIG. 3, a suitable trigger pulse generator 20 may be made with a pair of standard CMOS gates 27 and 28 which are commercially available in an integrated circuit such as the type 4001B Quad Nor Gate. The trigger pulse generator 20 may, for example, produce a narrow rectangular pulse 29 of approximately 300 microseconds pulse width having reasonably sharply rising and falling edges. Logic signals or pulses are discussed with reference to the negative supply line 26 as the logic signal reference level such that the pulse is positive relative to such reference level. The specific circuit of pulse generator 20 is more fully described in RCA Application Note ICAN-6267, and, consequently, no detailed description thereof is presented herein.

The output of the generator 20 is coupled to a retriggerable timer 30, which is schematically shown in FIG. 3 and which is known as a compensated monostable circuit. The circuit includes a pair of NOR gates 31 and 32 with appropriate R-C timing circuits 33 and 34. The circuit illustrated is basically that shown and described in RCA Application Note ICAN-6267, except for the addition of series resistor 35 in series with the coupling diode 36 between the two NOR gates of the retriggerable timer. The retriggerable timer 30 is retriggered, i.e. reset and restarted on another time-out cycle by the trailing or negative-going edge of the pulse 29 from the pulse generator. The resistor 35 creates an additional short delay in the resetting of the output of NOR gate 32. When the timer circuit 30 is retriggered by such trailing edge of the trigger pulse, the previous state of the timer output is thereby retained for an additional short period after the trigger pulse has been completed as a result of the added resistor 35, for reasons to be discussed later. The time-out period of the monostable timer 30 determines the low limit speed of the engine at which a stepped spark advance occurs, as follows.

The output state of the timer 30 is captured in a gated latch 37. As shown in FIG. 3, the gated latch 37 may be constructed of four standard CMOS NAND gates 38 such as are available in the type 4011B Quad Nand gate, and which are connected in a known flip-flop configuration. One input 39 is the clocking or triggering input and is connected to the output of the trigger pulse generator 20. The second input 40 is the data input and is connected to the output of timer 30.

The gated latch 37 has two complementary outputs 38a and 38b.

During substantially the entire 0.3 millisecond period of the trigger pulse 29 the one output 38a of the latch slaves itself to match the data input 40. The slaving is very fast, with output 38a lagging behind data input 40 by less than 0.2 microsecond, typically.

When the trigger pulse 29 terminates, the latch output 38a ceases its slaving of the data input 40, and remains frozen in its existing state. Latch 37 thus captures the output state of timer 30 at the instant when trigger pulse 29 falls below the gating threshhold of latch 37.

If the terminating or trailing edge of trigger pulse 29 occurs before timer 30 has timed out, the latch 37 will capture the logic 0 signal relative to line 26 which then exists at data input 40. Latch output 38a will be frozen at logic 1, both relative to line 26 which is regarded as logic 0 level. Such conditions are associated with an engine speed above the preselected switching speed, where the period between successive trigger pulse trailing edges is less than the period of timer 30.

Conversely, if the terminating or trailing edge of trigger pulse 29 occurs after timer 30 has timed out, latch 37 will capture the logic 1 signal relative to line 26 which then exists at data input 40. Latch input 38a will be frozen at logic 1, and latch output 38b will be frozen at logic 0, both relative to line 26. Such conditions are associated with an engine speed below the preselected switching speed, where the period between successive trigger pulse trailing edges is greater than the period of timer 30. Thus the period of timer 30 is the determining factor in the calibration of speed switch 12 of FIGS. 1, 2, and 3. Speed switch 12 switches on below the preselected speed and initiates the spark advance.

The foregoing is a general description of the operation of timer 30 and latch 37 in producing the speed switch function.

Typically, the period of timer 30 is set at 20 milliseconds, which corresponds to a frequency of 50 Hz, which is the output frequency of stator winding 18 at an engine speed of 500 RPM. Flywheel 5 contains on its inner periphery a 12 pole ring of permanent magnets, which causes alternator winding 18 to generate six complete electrical cycles of voltage for each single revolution of the flywheel.

Thus, at an engine speed above 500 RPM, trigger pulses 29 will occur with a period of less than 20 milliseconds. Timer 30 will not have enough time to time out before being restarted on a new timing cycle. Consequently, latch 37 will receive a steady logic 0 signal at data input 40, and will capture and hold steady at the logic 0 state.

At an engine speed below 492.6 RPM, trigger pulses 29 will occur with a period greater than 20.3 milliseconds. Timer 30 will have enough time to time out even before the leading edge of the 0.3 millisecond wide trigger pulse arrives. Consequently, all through the 0.3 millisecond trigger pulse interval latch 37 will receive a steady logic 1 signal at data input 40, and will capture and hold steady at the logic 1 state.

At engine speeds above 492.6 RPM but below 500 RPM, timer 30 will time out during the 0.3 millisecond trigger pulse interval. Therefore, during the first part of the trigger pulse interval the signal at data input 40 will be an incorrect logic 0 and latch outputs 38a and 38b will be temporarily driven to incorrect logic states. During the last part of the trigger pulse interval the signal at data input 40 will become the correct logic 1 signal, and latch outputs 38a and 38b will recover in time to be frozen in the correct states when the trigger pulse trailing edge passes. The speed switch function provided by timer 30 and latch 37 is therefor less than perfect only in that narrow range of speed wherein timer 30 times out during the relatively short interval of trigger pulse 29. At worst, the outputs of latch 37 are incorrect for 0.3 millisecond out of every 20 milliseconds, or for only 1.5% of the total time. The circuitry following latch 37 has an essentially low-pass filter characteristic and thus effectively filters out these very short duration deviations from the ideal speed switch output. Consequently, the speed switch may as a practical matter, be regarded as an ideal switch, set to switch at a suitable engine speed, typically 500 RPM.

Below 500 RPM the speed switch turns on and causes an electronic spark advance. Above 500 RPM the speed switch turns off and allows the spark angle to return to normal.

This turning on or off action of the speed switch is initiated by the trigger pulse 29, which in turn is derived from the output of alternator winding 18. As mentioned previously, alternator winding 18 produces six complete electrical cycles per flywheel revolution. Consequently, there are six trigger pulses 29 per revolution, which therefor produces an updating of the speed switch output state every 60 degrees of rotation.

Calibration of the speed switch is achieved by trimming one of the two approximately equal RC discharge networks contained in timer 30. In FIG. 3, the first RC discharge network 33 is composed of capacitor 33a and resistors 33b plus 41. Resistors 41 are the trimming resistors selected to achieve the desired calibration. Resistor 33b helps to maintain proper circuit operation during the calibration process, serving to buffer the input of gate 31 from extraneous noise voltages that may be present in the external calibrating resistor apparatus. When the proper calibrating resistance values have been determined, appropriate calibrating resistors 41 are permanently installed in the circuit.

The second RC discharge network is composed specifically of capacitor 35a and resistor 35b contained within network 34. The purpose of resistor 35, as mentioned previously, is to allow the output of timer 30, which is of course identical to the output of gate 32, to be retained for a short period of time after the trigger pulse 29 has been completed. This is essential for the avoidance of any possible logic race condition between the inputs 39 and 40 of latch 37.

The trigger pulse 29, which supplies input 39, does not have a sufficiently steep trailing edge to assure error-free operation of timer 30 and latch 37. Specifically, if timer 30 is constructed with NOR gates 31 and 32 which have input threshold voltages well above the average, and latch 37 is constructed with NAND gates 38 which have input threshold voltages well below the average, the relatively slow transition of the trigger pulse trailing edge would first retrigger the timer 30, and would then subsequently cause the latch 37 to enter its latched or frozen condition. Without resistor 35, such a combination would tend to cause the latch to always capture the logic 0 retriggered output from the timer, even if the timer had previously timed out and had produced a logic 1 signal on its output.

With resistor 35 included, but otherwise under the same conditions as just described, the occurrence of the trailing edge of trigger pulse 29 would first cause the output of gate 31 to go to a logic 1 condition. Shortly thereafter the trigger pulse voltage would drop below the threshold voltage of input 39 of latch 37, and the latch 37 would safely enter its frozen condition. Finally, the voltage on capacitor 35a would rise above the input threshold of gate 32, and the output of gate 32 and thus latch input 40 would go to the retriggered logic 0 condition. Resistor 35 thus slows down the rate of rise of voltage on capacitor 35a and effectively postpones any retriggering of the timer output until after the latching action is safely over.

Previously it was stated that the speed switch may, as a practical matter, be regarded as an ideal switch, set to switch at a suitable engine speed, typically 500 RPM. The speed switch 12 of FIG. 1 is of course comprised of retriggerable timer 30 and latch 37 of FIGS. 2 and 3. Below 500 RPM, the speed switch turns on and causes an electronic spark advance as follows:

Below 500 RPM, the latch 37 captures the logic 1 output from the timer, signifying that the timer has timed out. The captured logic 1 status is held until the next updating trigger pulse 29 occurs, at which time the logic status will be maintained at logic 1 if the speed is below 500 RPM, of at logic 0 if the speed is above 500 RPM. This process repeats for every 60 degrees of flywheel rotation.

Following speed switch 12 in FIG. 1 is spark advance controller 13. Controller 13 is comprised of response control network 42 and voltage-controlled load 43, the latter being connected as a controllable load on the reverse bias voltage line 17a from capacitor 17 of ignition system 8, as shown in FIGS. 2 and 3. The ignition system 8 shown in FIG. 3 is illustrative only. Reference should be made to U.S. Pat. No. 4,015,564 for a more complete description.

When latch 37 captures a logic 1 output from the timer 30, complementary latch output 38b will be driven to a logic "0" level, which is essentially that of the negative voltage supply line 26. This logic "0" signal allows the response control network 42 to turn on the voltage control load 43 which produces a rapid substantial modification of the voltage on the reverse bias line 17a and capacitor 17 of the ignition system 8. The modification creates an automatic electronic spark advance, generally a step-like change if viewed on a steady-state basis, as shown at 44 in FIG. 4.

The response control network 42 provides a rapid but controlled turn on of the electronic spark advance and a somewhat slower return to the normal spark angle.

As shown in FIG. 3, response control network 42 may be a simple RC filter network including a capacitor 46 and resistor 47. The network 42 is coupled through a diode 48 to the complement output 38b of latch 37. A rapid spark advance and a somewhat slower spark return to normal angle are readily produced by appropriate selection of the charging resistor 47 and the discharge circuit, with resistance values such that the time constant for charging the response control capacitor 46 is significantly shorter than the time constant for discharging same. When latch 37 applies a logic "0" signal to the response network, the capacitor 46 is rapidly charged, thereby transferring of the logic control signal to the voltage control load 43. However, when the logic signal returns to logic "1" the response control network 42 is effectively disconnected from the latch by diode 48, and capacitor 46 slowly discharges through the remaining resistors with a discharging time constant which is longer than the charging time constant. Typically, satisfactory operation has been obtained using a time constant ratio of approximately 3.5 to 1.

In the illustrated embodiment of the invention, a resistor 49 is included across the output of the response control network 42 such that the output voltage of the network 42 is essentially unaffected by unit to unit variations in the input current drawn by the voltage controlled load 43.

The voltage controlled load 43 is shown as a transistorized circuit including a high gain transistor 50 and a current feedback resistor 51 connected across the output of the network 42.

The high gain transistor 50 with the current feedback resistor 51 are readily constructed in a practical manufacturing process with a good degree of uniformity from one unit to the next, particularly when driven from a network such as network 42.

A current limit safety transistor 52 is shown connected across the input to transistor 50, with its input across the current feedback resistor 51. The transistor 52 turns on at a selected current in resistor 51 and limits the output current of transistor 50. The current limit on the high gain transistor 50 permits providing a relatively substantial available output current under idle speed conditions to draw down the reverse bias voltage on the bias capacitor 17 and provide a significant advance of the spark angle. At high engine speeds, however, the current limit on transistor 50 provides protection to the engine in the event of a failure in the low speed limiting apparatus upstream from the voltage controlled load 43. At maximum engine speed, for example, the throttle plates are fully opened and the spark is fully advanced through the conventional mechanical advance linkage mechanism. Under the above conditions, detonation and piston damage could occur if the spark were to be significantly further advanced. This will not occur even through a failure in the limiter might occur upstream of the transistors 50, 52. Under such failure conditions, the output of the ignition trigger unit 7 is strongest and provides maximum available charge to the reverse bias voltage capacitor 17 of ignition system 8. A large reverse bias voltage is developed in the trigger circuit.

At such maximum speed condition, the amount of current available from transistor 50 as a result of the current limiting, when compared to the large bias capacitor charging current developed by the large ignition trigger signals of the ignition system, is small and cannot significantly reduce the reverse bias capacitor voltage. Practically, the inventor has found that with the illustrated circuit, the spark may typically advance only one degree, which is a relatively small and safe level.

An RC filter 53 is provided to couple the output of the high gain transistor 50 to the bias network. The low speed limiter unit is located in an environment in which strong transient voltages are often present and which can be picked up on the output wire. The RC filter 53 prevents damaging voltages from reaching transistors 50, 52.

In the illustrated embodiment of the invention, a test input 54 to the voltage-controlled load 43 may be provided for ease of servicing. Grounding of the test input shuts off transistor 50 and the serviceman can then operate the engine as if the low speed limiter device was not even present.

Referring particularly to FIG. 4, a graphic illustration of the actual curve of spark angle versus flywheel RPM for a mechanically fixed trigger position is given for steady state conditions, i.e., after the response control network has stabilized. The normal engine speed characteristic is shown in full line illustration 55. Below 500 RPM, the spark remains essentially at zero spark angle and then gradually moves into a retard position. It is this characteristic which must be changed to improve engine idle performance. In the present invention, the characteristic is modified at the selected switching speed, such as 500 RPM, to produce an essentially concentrated step-like spark advance 44 which is of a significant magnitude. In the illustrated embodiment, the spark advances from zero to approximately nine degrees within the preferred range of change in engine speed, shown as less than 10 RPM, and then slowly trails off as the speed, on a steady state basis is reduced. Thus, as previously defined, substantial spark advance occurs within a narrow speed range which is less than ±2 percent of the idle speed.

The low speed limiter apparatus of the invention thus measures the rotational speed of the engine a plurality of times during each complete crankshaft revolution and electronically advances the ignition impulses by a very significant amount when a speed below a predetermined speed is detected. The limiter thus provides an additional speed and torque controlling input to that provided through the conventional manual control by the operator. The limiter will keep the engine running as long as the electronic spark advance develops sufficient added torque to overcome the condition that is causing the engine speed to drop. As a result of the construction of the limiter with its very high gain and rapid response which produces the large, step-like advance 44, the limiter functions to keep the engine idling properly even under conditions of suddenly applied propeller loads or rapidly increased exhaust gas back pressures as well as typically encountered fuel and electrical conditions which are not at optimum or ideal conditions.

The stiffness or steepness of the switching speed is clearly shown by the step change in the spark angle. When the engine is confronted with increased load, increased back pressure, some malfunctioning in a spark plug, poor fuel mixture or the like, the engine will not slow down appreciably because it can develop sufficient extra torque as a result of the automatic advance of the spark angle to overcome these problems.

The low speed limiter, as a result of its ability to advance the spark during low RPM, also contributes a significant and demonstratable improvement in the ease in which the engine can be started. Further, during the break-in period, the low speed limiter forces the brand new engine to develop the necessary additional torque to overcome the friction present as a result of the tight piston rings and the like. As the engine breaks in, the friction will become less and the low speed limiter automatically allows the spark to ease back to the correct preset basic ignition timing. This is not only advantageous from the standpoint of the manufacturer and serviceman but is desirable in that the owner does not have to return his engine to the dealer for the usual readjustment after the break-in period.

Further embodiments may, of course, be provided within the concept of the present invention. One alternate embodiment is shown in FIGS. 5 and 6 in which the latch 37 is replaced with "helper" monostable circuit 57 plus "OR" circuit 60 and the pulse generator 20 is replaced with a high gain inverting amplifier 58. FIG. 6 is a schematic diagram of one possible circuit for the block diagram illustration of FIG. 5. In the embodiment of FIGS. 5 and 6, cascaded edge-triggered or transition-triggered retriggerable monostable units 57 and 59 are used. The units, shown in FIG. 6, may be obtained in a single package as a dual retriggerable monostable. The inverting amplifier 58 may also be obtained in a single package with a second similar amplifier 60 connected in an "OR" gate configuration, as the result of the current development of CMOS integrated circuits. The amplifier 60 is used to connect monostables 57 and 59 to the response network 42. Thus the other system components may be the same as shown in FIGS. 2 and 3 and are correspondingly numbered.

More particularly, the inverting amplifier 58 includes a pair of transistors 61 and 62 which are coupled through a resistor 63 and connected by an output line 64 to a gate forming the input to first monostable unit 59. The resistor 63 has an asymmetrical effect on the output wave shape. In the illustrated circuit connection, resistor 63 causes a harmless slowing of the rise in the voltage signal at line 64 from the negative supply level to the positive supply level and a redesired increased rate in the fall of the voltage level from the positive level to the negative level. This difference confines triggering of the first monostable 59 to the rising voltage transition. Previously, it had been experimentally determined that the falling edge resulted in unwanted triggering if the transition was relatively slow, and amplifier 58 plus resistor 63 corrected this.

The second retriggerable monostable 57 has its input supplied from the main output of the first monostable 59.

Typically, the period of the first monostable 59 would be set for 20 milliseconds, which corresponds to an engine speed of 500 RPM. Also typically, the period of the second monostable 57 would be made approximately 50% greater than the period of the first monostable, or approximately 30 milliseconds.

At engine speeds above 500 RPM, the period between successive rising voltage transitions on line 64 is less than 20 milliseconds, which causes the first monostable 59 to be retriggered before it can time out. Its main output will thus hold steady at the logic "1" level, and its complement output will hold steady at the logic "0" level, relative to the negative power supply line 26.

The second monostable 57 will be fully timed out and will not be retriggered because its input from monostable 59 is holding steady at the logic "1" level, and monostable 57 is an edge triggered or transition-triggered device, as noted previously. The main output of monostable 57 will thus hold steady at the logic "0" level, and the complement output will hold steady at the logic "1" level, again relative to line 26.

Under the conditions described, both inputs to the gates of transistors 65 and 66 will be holding steady at the logic "0" level, and transistors 65 and 66 will be non-conducting.

Monostable 59, "helper" monostable 57, and "OR" circuit 60, taken together and considered to be a single functioning element equivalent to speed switch 12 of FIG. 1, have therefore been shown to produce the turned off condition of speed switch 12 at speeds above the selected speed of 500 RPM.

At engine speeds below 500 RPM, the period between successive rising voltage transitions on line 64 is greater than 20 milliseconds, and monostable 59 will time out prior to being retriggered.

From the time that monostable 59 times out until it is again retriggered, its main output will be a logic "0" and its complement output will be a logic "1." Transistor 65 will be conductive during this time.

Upon the retriggering of monostable 59, its main output will cause "helper" monostable 57 to be triggered. The complement output of monostable 59 will return to the logic "0" condition and transistor 65 will cease conduction. However, "helper" monostable 57 is now timing out, and during the next 30 milliseconds, approximately, its main output will be a logic "1," during which time transistor 66 will be conductive. Monostable 57 is thus "helping" monostable 59 maintain a steady input drive signal to response control network 42 via transistors 65 and 66.

After monostable 59 times out transistor 65 will again be conductive. Monostable 59 no longer needs help from monostable 57, but due to the longer timing period of monostable 57, transistor 66 will remain on for at least 10 milliseconds more, approximately. This overlap of the two monostables and their associated "OR" transistors is not critical or harmful, but the overlap should be kept to a practical minimum.

Thus, it has been shown that monostables 59 and 57 and "OR" circuit 60, taken together and considered to be a single functioning element equivalent to speed switch 12 of FIG. 1, can also produce the turned on condition of speed switch 12 at speeds below the selected speed of 500 RPM.

Overall, the two monostables and the "OR" circuit provide a satisfactory speed switch function for actuating the voltage controlled load circuit, such as that previously described and shown.

Although the second embodiment of this invention also provides a satisfactory system, the component cost is somewhat higher than that of the preferred embodiment and under certain tests, the second embodiment was found to be more susceptible to false triggering by RFI signals. Other embodiments may, of course, also be readily provided. For example, a circuit may be constructed that employs a rechargeable RC timing network in which the shaped stator output signal is applied to the rechargeable RC timing network, the output of which is connected to a differential amplifier for generating suitable signals to the response controlling network. Although providing satisfactory operation, its cost, reproducibility, susceptibility to RFI triggering and the like were significantly less satisfactory than the embodiments described, and no further description thereof is given. Further, with the development of integrated circuitry and the like including longchain counters, microcomputers and the like, other low limit speed controllers can be readily designed following the teaching herein to produce the functions and results of the present invention. For example, microcomputers or processors may be readily programmed in a logical fashion to produce the desired function provided by the present invention and particularly the preferred embodiment. In such a computer-based system, an appropriate speed related interrupt signal may be developed from the stator waveform and by appropriate processing of the successive interrupt signals, the microcomputer could readily determine the effective engine speed and produce an output effectively corresponding to that of the speed switch. Appropriate further internal processing of such a signal could even permit the generation of the rapid advance effect and the somewhat slower spark retard effect now obtained by means of response control network 42.

The present invention has been found to provide a novel and effective low limit speed control, which is relatively easy to construct, calibrate, and test.

I claim:

1. In a solid state ignition system for a two-cycle engine, a low speed limit control means capable of producing an essentially concentrated, steep, step-like substantial advance of the ignition angle or timing with reducing engine speed, comprised of a rapidly responding electronic spark advance means and a speed sensing means connected to sense the engine speed and responsive below a preselected minimum engine speed to actuate said electronic spark advance means, and wherein said advance means and speed sensing means are constructed and arranged to change the ignition angle by approximately 9 degrees in a narrow speed range of less than plus and minus five percent of said preselected minimum engine speed.

2. In the ignition system of claim 1, wherein a switch means is included in the speed sensing means, said switch means being turned essentially wholly "on" and "off" in a narrow speed range including the minimum engine speed to turn the advance means on and off.

3. In the ignition system of claim 2 wherein an engine-driven alternator includes a stator winding having a speed-related output, the switch means including digital logic circuit elements coupled to the stator winding and generating a rapidly changing control signal at the preselected speed.

4. In the ignition system of claim 1 wherein the advance means has an asymmetrical rate of response and produces a relatively rapid advance output and a somewhat slower retard output in response to the speed sensing means.

5. In the ignition system of claim 3 wherein said advance means has an asymmetrical rate of response and produces a relatively rapid advance output and a somewhat slower retard output in response to the speed sensing means.

6. In the ignition system of claims 1, 2, 3, 4, or 5, wherein the spark advance means is limited to creating a substantial advance of the ignition angle at engine speeds substantially below maximum engine speed.

7. A low speed limiter unit for a solid state ignition system for a two-cycle internal combustion engine, containing an electronic advance means adapted to be driven fully on or fully off to automatically advance the spark angle and timing with a step-like characteristic of spark angle vs. engine speed, sensing means for sensing the engine speed and generating a plurality of pulses for each revolution of the engine, and speed switch means designed to receive and respond to said pulses and effectively control said electronic advance means to actuate said advance means in response to the frequency of said pulses dropping below that selected pulse frequency which is associated with the selected low limit engine speed, said speed sensing menas being provided with an input signal containing a plurality of voltage waves for each complete firing sequency of the engine, a shaping circuit being connected to receive said voltage waves and to generate for each individual voltage wave a generally rectangular pulse, said speed switch means including a restartable timing circuit means followed by a control switch means being connected to said shaping circuit for producing a first logic output condition above said selected pulse frequency and a second logic output condition below said selected pulse frequency, with said timing circuit means determining said first or second logic output conditions, respectively, of said switch means to drive said electronic advance means.

8. The low speed limiter unit of claim 7 including a response control network connected between said speed switch means and said advance means, said network including means to rapidly establish a control signal for actuating the advance means in response to a change to said second logic output and including means to less rapidly remove said control signal in response to the recovery from said second logic output to the first logic output.

9. The low speed limiter unit of claim 7 wherein said timing circuit means includes a pulse generator connected to said shaping circuit, a retriggerable monostable circuit having a trigger input connected to said pulse generator, and said control switch means includes a gated latch having main and complementary outputs, said latch having a first input connected to the pulse generator and a second input connected to the monostable circuit and having a main output signal essentially corresponding to the instantaneous state of the second input at the time that the first input drops below the gating threshold of the latch.

10. The low speed limiter unit of claim 7 wherein said timing circuit means includes first and second series connected retriggerable monostable circuits, and said control switch means includes a two input "OR" gate means connected to the monostable circuits.

11. The low speed limiter unit of claims 9 or 10 including a response control network connected between said control switch means and said advance means, said network including means to rapidly establish a control signal for actuating the advance means in response to said second logic output condition and including means to less rapidly remove said control signal in response to the recovery from said second logic output condition to the first logic output condition.

12. The low speed limiter unit of claim 11 applied to an ignition system having an ignition triggering reverse bias capacitor charged from the ignition systems trigger unit to maintain an essentially constant ignition angle with speed, wherein said advance means is a voltage controlled load able to drain charge from said bias capacitor having a control input connected to said response control network and an output connected to said bias capacitor to drain charge from said bias capacitor and thereby reduce the triggering reverse bias coltage and cause an electronic spark advance below said selected engine speed, and a current-limit means is included in said voltage-controlled load to limit the maximum load current.

13. The low speed limiter unit of claim 12 wherein said voltage-controlled load is a first high-gain transistor having its base-connected to the control voltage source and having negative current feedback provided by a current sensing resistor in series with the emitter of said first transistor, and said current-limit means is a second transistor having its input connected to said current sensing resistor and its output connected to reduce said control voltage source when the current in said current sensing resistor becomes excessive.

14. A low speed limiter unit for a solid state ignition system for a two-cycle internal combustion engine wherein the ignition system is driven from an alternator having a stator winding producing output voltage of a speed-related frequency, containing an electronic advance means adapted to be driven fully on or fully off to automatically advance the spark angle or timing with a step-like characteristic of spark angle vs. engine speed, sensing means for sensing the engine speed and generating a plurality of pulses for each revolution of the engine, and speed switch means designed to receive and respond to said pulses and effectively control said electronic advance means to actuate said advance means in response to the frequency of said pulses dropping below that selected pulse frequency which is associated with the selected low limit engine speed, said speed sensing means including a shaping circuit connected to said stator winding and producing a series of pulses having a frequency related to the frequency of said output voltage, said speed sensing means further includes a retriggerable timing unit having an input connected to said shaping circuit and having an output which remains at a first logic level when the frequency of said series of pulses is above a selected frequency and which switches between said first logic level and a second logic level when the frequency of said series of pulses is below said selected frequency, said speed switch means includes a gated latch means having inputs connected to said timing unit and to said shaping circuit to produce an essentially wholly off or wholly on output state in response to the inputs, said latch means being connected to actuate said advance means.

15. The low speed limiter unit of claim 14 wherein said timing unit includes a pulse generator connected to said shaping circuit to generate a control pulse for the combined purposes of triggering and latching, a retriggerable monostable circuit having a trigger input connected to said pulse generator, said retriggerable monostable circuit including first and second series connected logic gates with a delay means connected between the logic gates, and said gated latch includes a first input connected to the pulse generator and a second input connected to the monostable circuit and an output which produces a logic signal essentially corresponding to the logic signal existing at said second input when said control pulse terminates, said latch safely leaving data acquisition mode and entering data storage mode upon termination of said control pulse prior to reset of the second logic gate in delayed response to the termination of same said control pulse.

16. The low speed limiter unit of claim 15 including a response control network connected to said switch means and to said advance means, said network including means to rapidly establish a control signal for actuating the advance means in response to said second logic output condition or wholly on output state and including means to less rapidly remove said control signal in response to the change from said second logic output condition or wholly on state to said first logic output condition or wholly off output state.

17. In a capacitor discharge ignition system having an alternator for charging the discharge capacitor means and having a triggered thyristor means for discharging said discharge capacitor means and an ignition trigger signal source plus a reverse bias capacitor means connected to operate said thyristor means and establishing over the operating speed range of the engine an essentially constant ignition angle characteristic in the assumed absence of angular relocation of the ignition trigger signal source, a low speed limiter comprised of a signal shaping circuit connected to said alternator and producing a series of pulse signals for each complete firing sequency of the engine, the frequency of said pulse signals being directly related to the speed of the engine, said shaping circuit establishing a generally square wave pulse signal having a generally non-zero average value, a triggered solid state pulse source means for generating a short rectangular pulse signal of selected constant period for each said square wave pulse signal, a retriggerable timer including gated logic elements and time constant means connected to said triggered solid state means, a two input switch possessing memory with its first input connected to said triggered solid state means and its second input connected to said retriggerable timer, said two input switch being responsive to the logic level of the signal at its second input during the said short rectangular pulse generated by said triggered solid state means connected to its first input and operating solely on memory at all other times, said switch switching wholly on when the frequency of said pulses from said signal shaping circuit is below a selected frequency, and said switch switching wholly off when the frequency of said pulses from said signal shaping circuit is above said selected frequency, and a voltage controlled load conntected to said switch and to said reverse bias capacitor means and operable to reduce the voltage on the capacitor and thereby advance the ignition angle characteristic, said limiter therefore being active below a selected speed associated with said selected frequency, and inactive above said selected speed.

18. In the ignition system of claim 17 wherein said low speed limiter responds by changing the ignition angle by approximately 9 degrees over a narrow speed range.

19. The ignition system of claim 18 wherein said advance is created in less than 5 percent of the preselected minimum speed.

* * * * *

UNITED STATES PATENT AND TRADEMARK OFFICE
CERTIFICATE OF CORRECTION

PATENT NO. : 4,244,336
DATED : January 13, 1981
INVENTOR(S) : ARTHUR O. FITZNER

It is certified that error appears in the above-identified patent and that said Letters Patent are hereby corrected as shown below:

Column 3, Line 17, After "control" cancel "level" and substitute therefore --- lever ---;

Column 3, Line 47, After "speed" cancel "swithc" and substitute therefore --- switch ---;

Column 8, Line 8, After "500 RPM," cancel "of" and substitute therefore --- or ---;

Column 9, Line 22, After "failure" cancel "in" and substitute therefore --- if ---;

UNITED STATES PATENT AND TRADEMARK OFFICE
CERTIFICATE OF CORRECTION

PATENT NO. : 4,244,336
DATED : January 13, 1981
INVENTOR(S) : Arthur O. Fitzner

It is certified that error appears in the above-identified patent and that said Letters Patent are hereby corrected as shown below:

| | |
|---|---|
| Column 10, Line 21, | After "of" cancel "suddently" and substitute therefore --- suddenly ---; |
| Column 13, Line 46, CLAIM 7 | After "sensing" cancel "menas" and substitute therefore --- means ---; |
| Column 14, Line 36, CLAIM 12 | After "bias" cancel "coltage" and substitute therefore --- voltage ---; |
| Column 16, Line 32, CLAIM 17 | After "load" cancel "conntected" and substitute therefore --- connected ---. |

Signed and Sealed this

Twenty-sixth Day of May 1981

[SEAL]

Attest:

RENE D. TEGTMEYER

Attesting Officer

Acting Commissioner of Patents and Trademarks